(12) United States Patent
Zhou et al.

(10) Patent No.: US 12,335,089 B2
(45) Date of Patent: Jun. 17, 2025

(54) NON-BINARY BEAM FAILURE INDICATORS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 17/369,810

(22) Filed: Jul. 7, 2021

(65) Prior Publication Data

US 2023/0010190 A1 Jan. 12, 2023

(51) Int. Cl.
*H04L 41/0677* (2022.01)
*H04L 5/00* (2006.01)
*H04W 24/08* (2009.01)

(52) U.S. Cl.
CPC ........ *H04L 41/0677* (2013.01); *H04L 5/0048* (2013.01); *H04W 24/08* (2013.01)

(58) Field of Classification Search
CPC .................................................. H04L 41/0677
See application file for complete search history.

(56) References Cited

U.S. PATENT DOCUMENTS

| 2019/0245737 | A1* | 8/2019 | Zhou | H04B 7/06 |
| 2020/0221390 | A1* | 7/2020 | Xu | H04W 52/0235 |
| 2021/0058134 | A1* | 2/2021 | Luo | H04B 7/06964 |
| 2021/0314218 | A1* | 10/2021 | Kang | H04B 7/0695 |
| 2022/0046438 | A1* | 2/2022 | Lo | H04B 7/0695 |
| 2022/0399925 | A1* | 12/2022 | Zhou | H04B 7/0695 |

* cited by examiner

*Primary Examiner* — Abdeltif Ajid
(74) *Attorney, Agent, or Firm* — Arun Swain

(57) ABSTRACT

Various aspects of the present disclosure generally relate to wireless communication. In some aspects, a user equipment (UE) may receive, using a beam, a reference signal associated with a channel for wireless communication. The UE may generate a non-binary beam failure indicator based at least in part on a measurement associated with the beam, wherein the non-binary beam failure indicator comprises at least one non-binary beam failure indicator value. Numerous other aspects are described.

29 Claims, 8 Drawing Sheets

NON-BINARY BEAM FAILURE INDICATORS

FIELD OF THE DISCLOSURE

Aspects of the present disclosure generally relate to wireless communication and to techniques and apparatuses associated with non-binary beam failure indicators.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory. The apparatus may include one or more processors, coupled to the memory, configured, receive, using a beam, a reference signal associated with a channel for wireless communication generate a non-binary beam failure indicator based at least in part on a measurement associated with the beam, where the non-binary beam failure indicator comprises at least one non-binary beam failure indicator value.

Some aspects described herein relate to an apparatus for wireless communication at a base station. The apparatus may include a memory. The apparatus may include one or more processors, coupled to the memory, configured, transmit a non-binary beam failure indicator configuration that indicates a non-binary beam failure indicator, the non-binary beam failure indicator comprising at least one non-binary beam failure indicator value transmit a periodic beam failure determination reference signal associated with a channel for wireless communication.

Some aspects described herein relate to a method of wireless communication performed by a UE. The method may include receiving, using a beam, a reference signal associated with a channel for wireless communication. The method may include generating a non-binary beam failure indicator based at least in part on a measurement associated with the beam, wherein the non-binary beam failure indicator comprises at least one non-binary beam failure indicator value.

Some aspects described herein relate to a method of wireless communication performed by a base station. The method may include transmitting a non-binary beam failure indicator configuration that indicates a non-binary beam failure indicator, the non-binary beam failure indicator comprising at least one non-binary beam failure indicator value. The method may include transmitting a periodic beam failure determination reference signal associated with a channel for wireless communication.

Some aspects described herein relate to a non-transitory computer-readable medium that stores a set of instructions for wireless communication by a UE. The set of instructions, when executed by one or more processors of the UE, may cause the UE to receive, using a beam, a reference signal associated with a channel for wireless communication. The set of instructions, when executed by one or more processors of the UE, may cause the UE to generate a non-binary beam failure indicator based at least in part on a measurement associated with the beam, wherein the non-binary beam failure indicator comprises at least one non-binary beam failure indicator value.

Some aspects described herein relate to a non-transitory computer-readable medium that stores a set of instructions for wireless communication by a base station. The set of instructions, when executed by one or more processors of the base station, may cause the base station to transmit a non-binary beam failure indicator configuration that indicates a non-binary beam failure indicator, the non-binary beam failure indicator comprising at least one non-binary beam failure indicator value. The set of instructions, when executed by one or more processors of the base station, may cause the base station to transmit a periodic beam failure determination reference signal associated with a channel for wireless communication.

Some aspects described herein relate to an apparatus for wireless communication. The apparatus may include means for receiving, using a beam, a reference signal associated with a channel for wireless communication. The apparatus may include means for generating a non-binary beam failure indicator based at least in part on a measurement associated with the beam, wherein the non-binary beam failure indicator comprises at least one non-binary beam failure indicator value.

Some aspects described herein relate to an apparatus for wireless communication. The apparatus may include means for transmitting a non-binary beam failure indicator configuration that indicates a non-binary beam failure indicator, the non-binary beam failure indicator comprising at least one non-binary beam failure indicator value. The apparatus may include means for transmitting a periodic beam failure determination reference signal associated with a channel for wireless communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
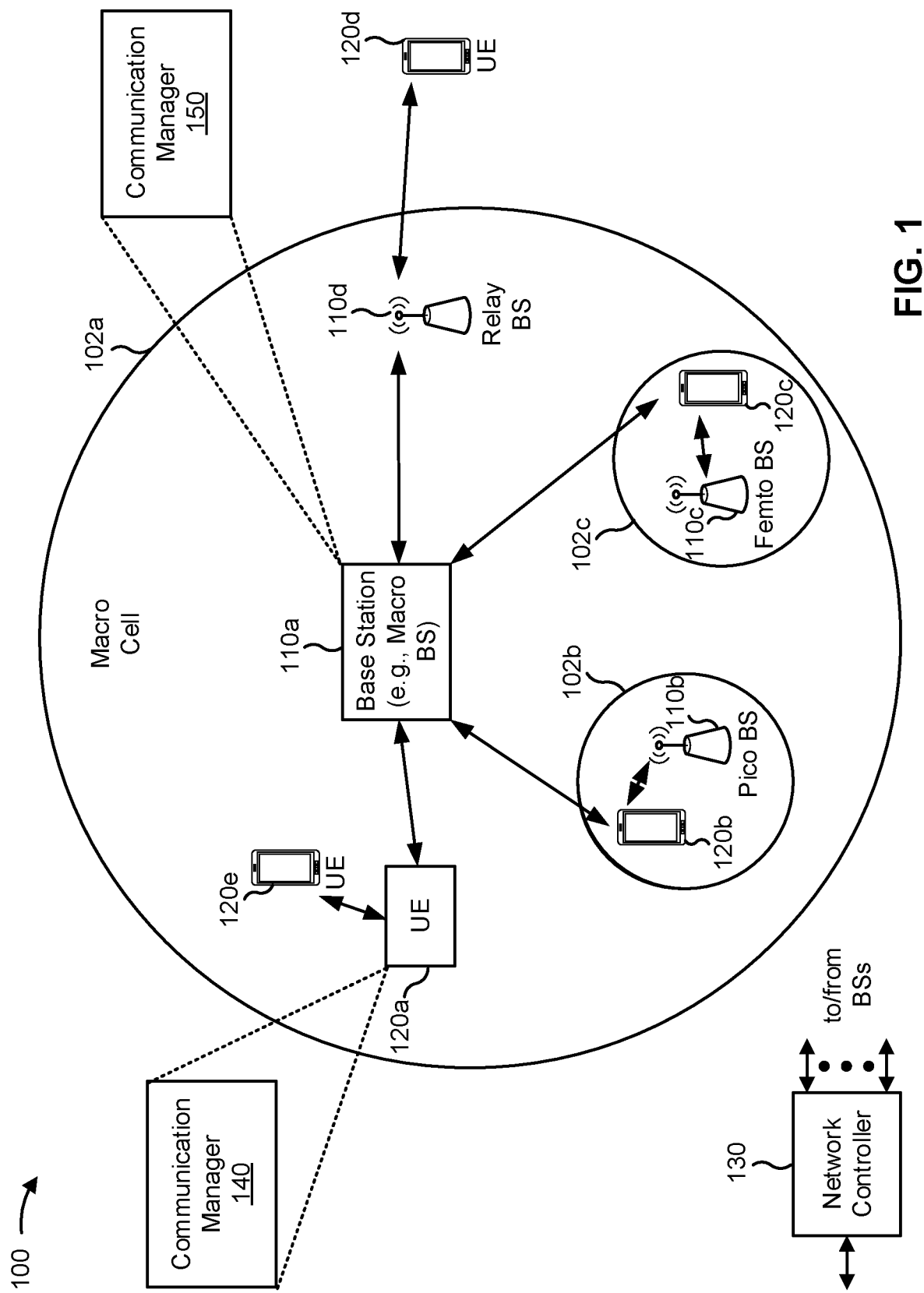
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, using a beam, a reference signal associated with a channel for wireless communication; and generate a non-binary beam failure indicator (BFI) based at least in part on a measurement associated with the beam, wherein the non-binary BFI comprises at least one non-binary BFI value. Additionally, or alternatively, the communication manager 140 may perform one or more other operations described herein.

In some aspects, the base station 110 may include a communication manager 150. As described in more detail elsewhere herein, the communication manager 150 may transmit a non-binary BFI configuration that indicates a non-binary BFI, the non-binary BFI comprising at least one non-binary BFI value; and transmit a periodic beam failure determination reference signal associated with a channel for wireless communication. Additionally, or alternatively, the communication manager 150 may perform one or more other operations described herein.

As indicated above, FIG. 1 is provided as an example. Other examples may differ from what is described with regard to FIG. 1.

Figure 2:
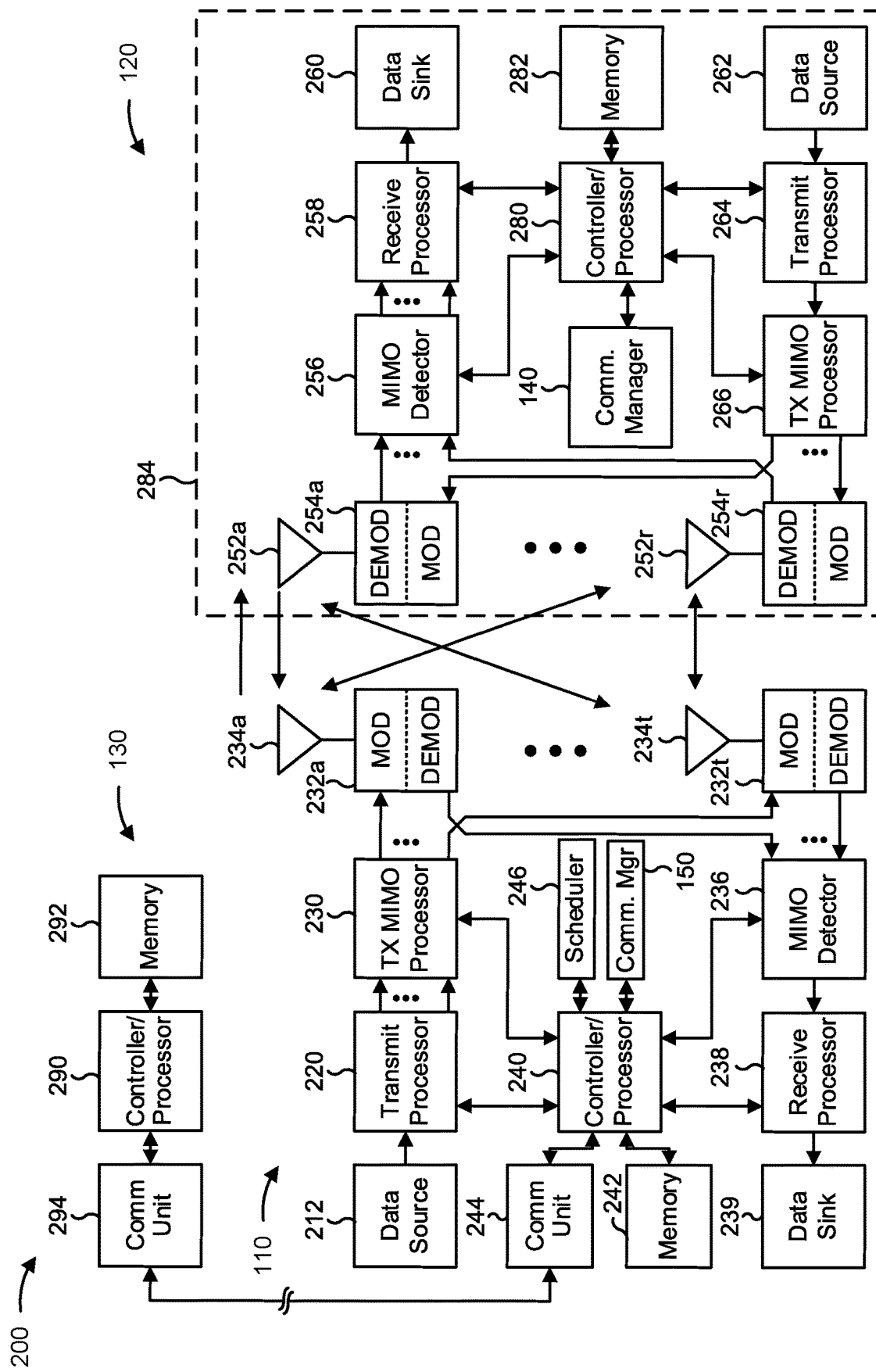
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with non-binary BFIs, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving, using a beam, a reference signal associated with a channel for wireless communication; and/or means for generating a non-binary BFI based at least in part on a measurement associated with the beam, wherein the non-binary BFI comprises at least one non-binary BFI value. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a non-binary BFI configuration that indicates a non-binary BFI, the non-binary BFI comprising at least one non-binary BFI value; and/or means for transmitting a periodic beam failure determination reference signal associated with a channel for wireless communication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
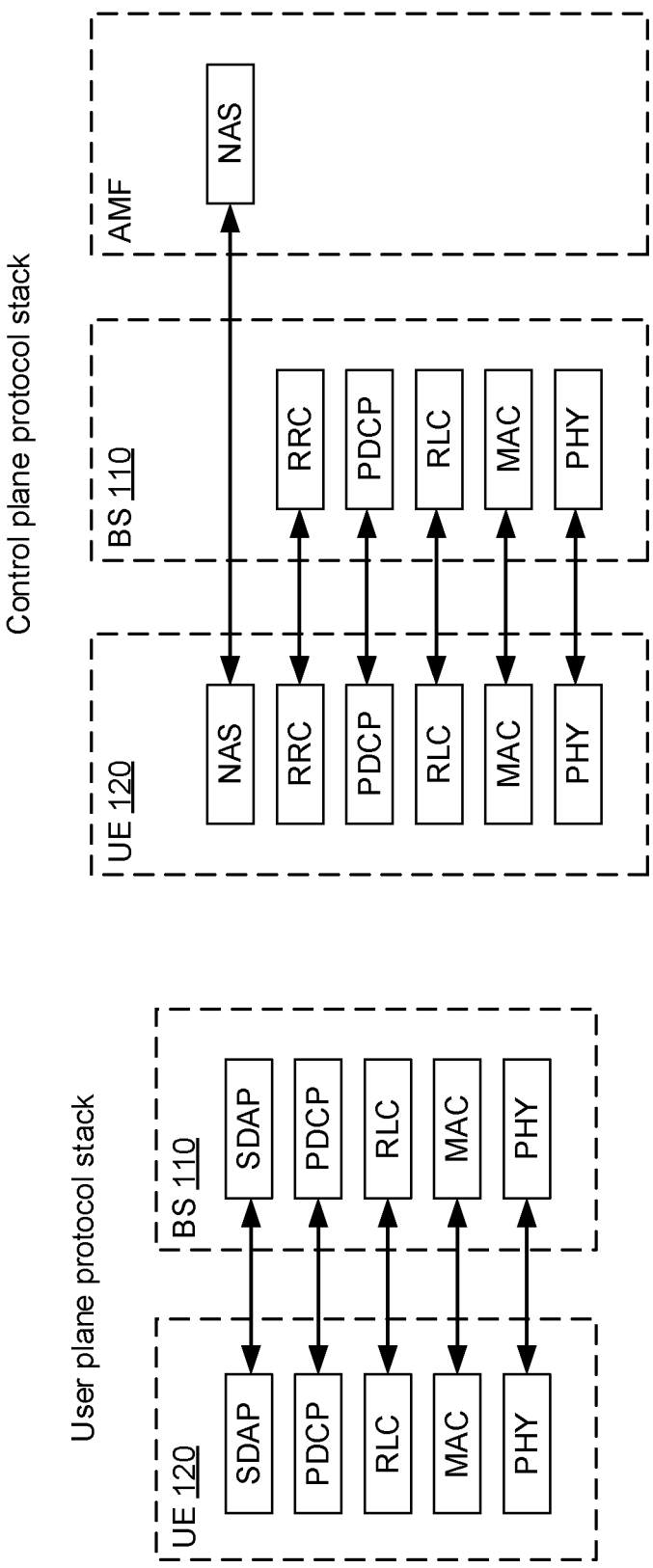
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

In wireless communication, beams may be used between a transmitter of a wireless communication device and a receiver of another wireless communication device to facilitate signal transmission. However, due to the uncertain nature of the wireless environment and potential unexpected blocking, beams may be vulnerable to beam failure. Beam failure may be caused by poor channel quality and/or temporary interference from other beams and/or other radio frequency signals, among other examples.

In some cases, a UE may be configured to determine beam failure based on calculating a physical downlink control channel (PDCCH) signal to interference plus noise ratio (SINR). The physical layer of a UE may determine, from the PDCCH SINR, a block error rate (BLER) and compare the SINR and/or the BLER to a threshold. If the SINR and/or BLER satisfies the threshold, the physical layer may provide a BFI to the MAC layer of the UE. However, the BFI may be binary and only indicates that the SINR and/or BLER satisfies a threshold or does not satisfy the threshold. The binary BFI may not be flexible for varying wireless environments and may not represent a full picture of channel conditions. For example, if an estimated BLER is 10% and the BLER threshold is 10%, a BFI may be indicated to the MAC layer. However, if the estimated BLER is much greater than 10% (e.g., 30% or 40%), the BFI may be indicated to the MAC in the same way, but this indication may not reflect the fact that the channel conditions may be dramatically different between the two estimates. In this way, the UE may inefficiently consume processing resources and/or cause unnecessary signaling overhead due to an inability to distinguish channel conditions and/or varying wireless environments and, as a result, may have a negative impact on network performance.

Some aspects of the techniques and apparatuses described herein may provide non-binary BFIs. For example, in some aspects, a UE may receive, using a beam, a reference signal and may generate a non-binary BFI based at least in part on a measurement associated with the beam, wherein the non-binary BFI comprises at least one non-binary BFI value. The non-binary BFI may include a first BFI that indicates that the beam failure is based at least in part on a poor channel quality or a second BFI that indicates that the beam failure is based at least in part on interference. The non-binary BFI may include a real number value that indicates a relative strength of a beam failure indication and/or a relative channel quality. In this way, some aspects may facilitate distinguishing varying wireless environments and channel qualities associated with determinations of beam failure, which may enable a UE to initiate beam failure recovery procedures only in appropriate circumstances (e.g., when beam failure is caused by poor signal quality). Additionally, aspects of the cause-oriented BFI may provide a more precise description of channel condition, and/or may facilitate power saving and/or delay reduction.

As a result, some aspects may reduce unnecessary processing and signaling overhead, which may have a positive impact on network performance.

As indicated above, FIG. 3 is provided as an example. Other examples may differ from what is described with regard to FIG. 3. In some aspects, beam failure detection and/or generation of non-binary BFIs may be performed by layers other than the physical protocol layer or the MAC layer.

Figure 4:
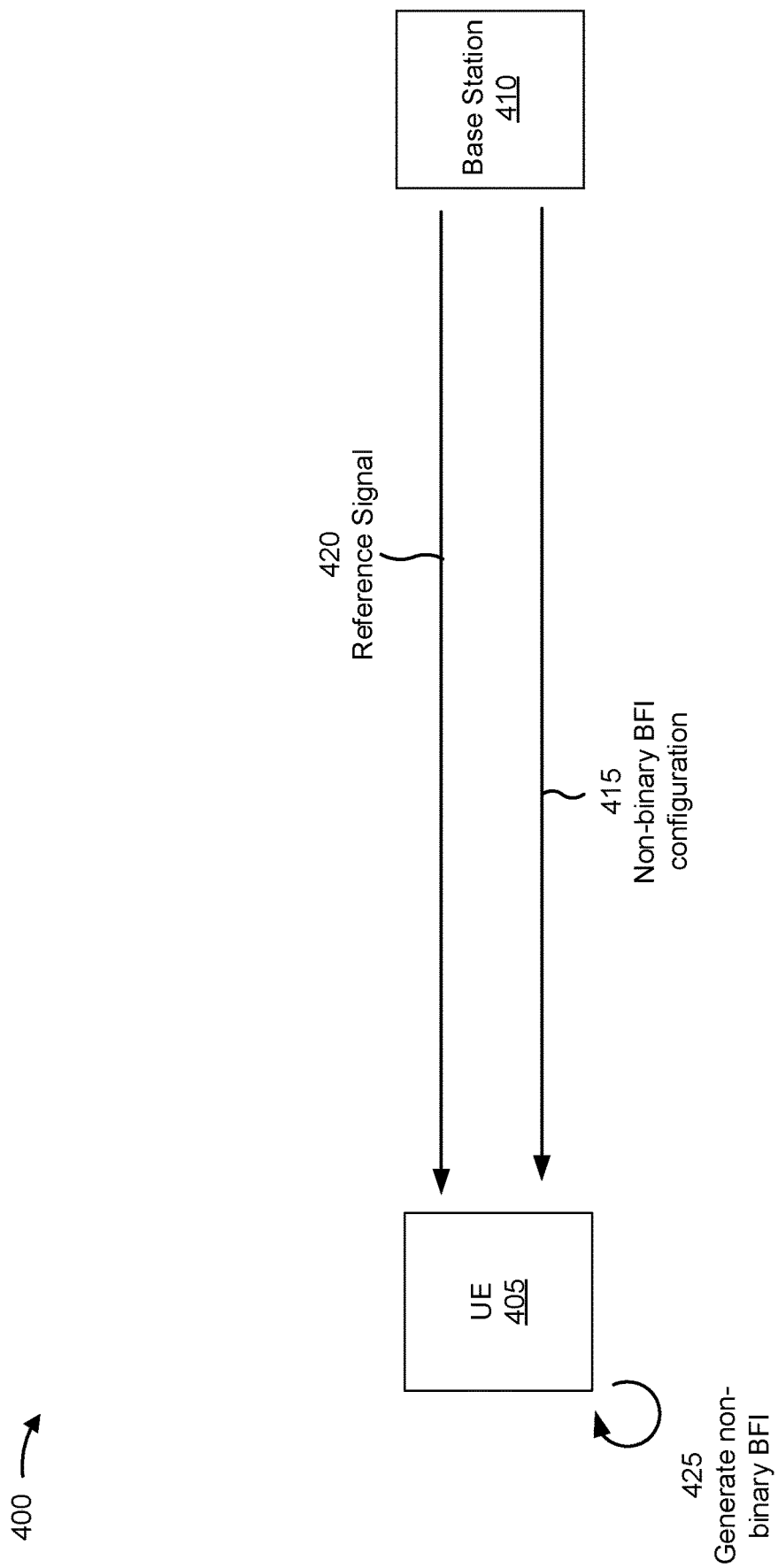
FIG. 4 is a diagram illustrating an example associated with non-binary beam failure indicators, in accordance with the present disclosure.

FIG. 4 is a diagram illustrating an example 400 of non-binary beam failure indications, in accordance with the present disclosure. As shown in FIG. 4, a UE 405 and a base station 410 may communicate with one another.

As shown by reference number 415, the base station 410 may transmit, and the UE 405 may receive, a non-binary BFI configuration. For example, the base station 410 may transmit an RRC message that includes the non-binary BFI configuration. The non-binary BFI configuration may indicate one or more parameter values associated with determining non-binary BFIs based on received reference signals. Whereas a binary BFI is a BFI that includes a value having only two possible values, a non-binary BFI is a BFI that includes a value that has more than two possible values. In some aspects, for example, a non-binary BFI may include a non-binary BFI value that may be a real number having a set of three or more real numbers as a possible value. In some aspects, a non-binary BFI may include a non-binary BFI value that has a set of three or more integers as possible values.

In some aspects, a non-binary BFI value may indicate beam failure and/or a relative strength of a beam failure indication. A relative strength of a beam failure indication may indicate a confidence level associated with a beam failure indication and/or a degree of failure indicated by the BFI, among other examples. For example, a non-binary BFI value of zero may be associated with a non-binary BFI that indicates that a radio link quality associated with a current measurement occasion satisfies a radio link quality threshold, while higher non-binary BFI values may indicate correspondingly stronger BFIs that indicate that the radio link quality threshold is not satisfied and/or a degree to which the radio link quality threshold is not satisfied.

In some aspects, the one or more parameters may indicate a calculation function for calculating a non-binary BFI value. In some aspects, the one or more parameters may indicate a lookup table that maps a set of potential non-binary BFI values to a set of potential channel condition estimates. The set of potential channel condition estimates may include values that may be determined using one or more channel condition measurements or ranges of those values. The channel condition measurements may include, for example, channel quality measurements and/or interference measurements. Channel quality measurements may include, for example, RSRP and/or RSRQ, among other examples. Interference measurements may include measurements of interference power and/or an SINR, among other examples.

In some aspects, the non-binary BFI configuration may indicate a set of radio link quality threshold values associated with at least one of a strength threshold or an interference threshold. In some aspects, the non-binary BFI configuration may indicate a first BFI that is configured to indicate a failure of the beam based at least in part on a channel quality of the channel, a second BFI that is configured to indicate a failure of the beam based at least in part on interference, a strength threshold, and/or an interference threshold, among other examples.

In some aspects, the base station 410 may transmit, and the UE 405 may receive, a parameter switch indication to switch from a first value of the set of parameter values to a second value of the set of parameter values. For example, the base station 410 may transmit the parameter switch indication using a downlink control information (DCI) transmission and/or a MAC control element (MAC CE).

As shown by reference number 420, the base station 410 may transmit, and the UE 405 may receive, using a beam, a periodic reference signal. The reference signal may include a beam failure determination reference signal (BFD-RS) associated with a channel for wireless communication. In some aspects, the reference signal may include a dedicated BFD-RS, synchronization signal block (SSB), or channel state information-RS (CSI-RS).

As shown by reference number 425, the UE 405 may generate a non-binary BFI based at least in part on a measurement associated with the beam, wherein the non-binary BFI comprises at least one non-binary BFI value. In some aspects, the non-binary BFI may indicate a current channel condition associated with the beam.

In some aspects, the UE 405 may generate a beam failure report based at least in part on determining a count of a plurality of beam failure indications. The at least one non-binary BFI value may include or be treated as a weight associated with at least one beam failure indication of the plurality of beam failure indications. In some aspects, the UE 405 may determine at least one rounded non-binary BFI value by rounding the at least one non-binary BFI value to at least one nearest integer and may determine a count of a plurality of beam failure indications based at least in part on the at least one rounded non-binary BFI value. For example, non-binary BFI values may be rounded up or down to a nearest integer (e.g., using ceiling or floor operations).

In some aspects, the UE 405 may determine beam failure based at least in part determining the non-binary BFI value. The UE 405 may compare the non-binary BFI value to a beam failure threshold. Based at least in part on the comparison, the UE 405 may generate a BFI and provide that BFI to one or more upper layers of the UE 405. In response to generation of the BFI, the UE 405 may initiate a beam failure recovery procedure, for example. The non-binary BFI may include a first BFI that indicates a failure of the beam based at least in part on a channel quality of the channel. The non-binary BFI may include a second BFI that indicates a failure of the beam based at least in part on interference. In some aspects, one or more aspects of the beam failure recovery procedure may be based at least in part on the type of BFI generated. For example, a first type of beam failure recovery procedure may be used based at least in part on generating a channel quality-based BFI, and a second type of beam failure recovery procedure may be used based at least in part on generating an interference-based BFI.

In some aspects, a physical protocol layer of the UE 405 may generate the non-binary BFI. The physical protocol layer may report the non-binary BFI to a MAC layer of the UE 405. In some aspects, the MAC layer of the UE 405 may generate the non-binary BFI. For example, the physical layer may determine the channel signal strength and the interference power measurement and may report the channel signal strength and the interference power measurement to the MAC layer.

As indicated above, FIG. 4 is provided as an example. Other examples may differ from what is described with respect to FIG. 4. For example, in some aspects, the UE 405 may generate a non-binary BFI and a binary BFI. For example, the UE 405 may generate a non-binary BFI periodically, after a threshold number of binary BFIs, based on receiving an indication to do so, and/or based on detection of occurrence of a trigger event, among other examples.

Figure 5:
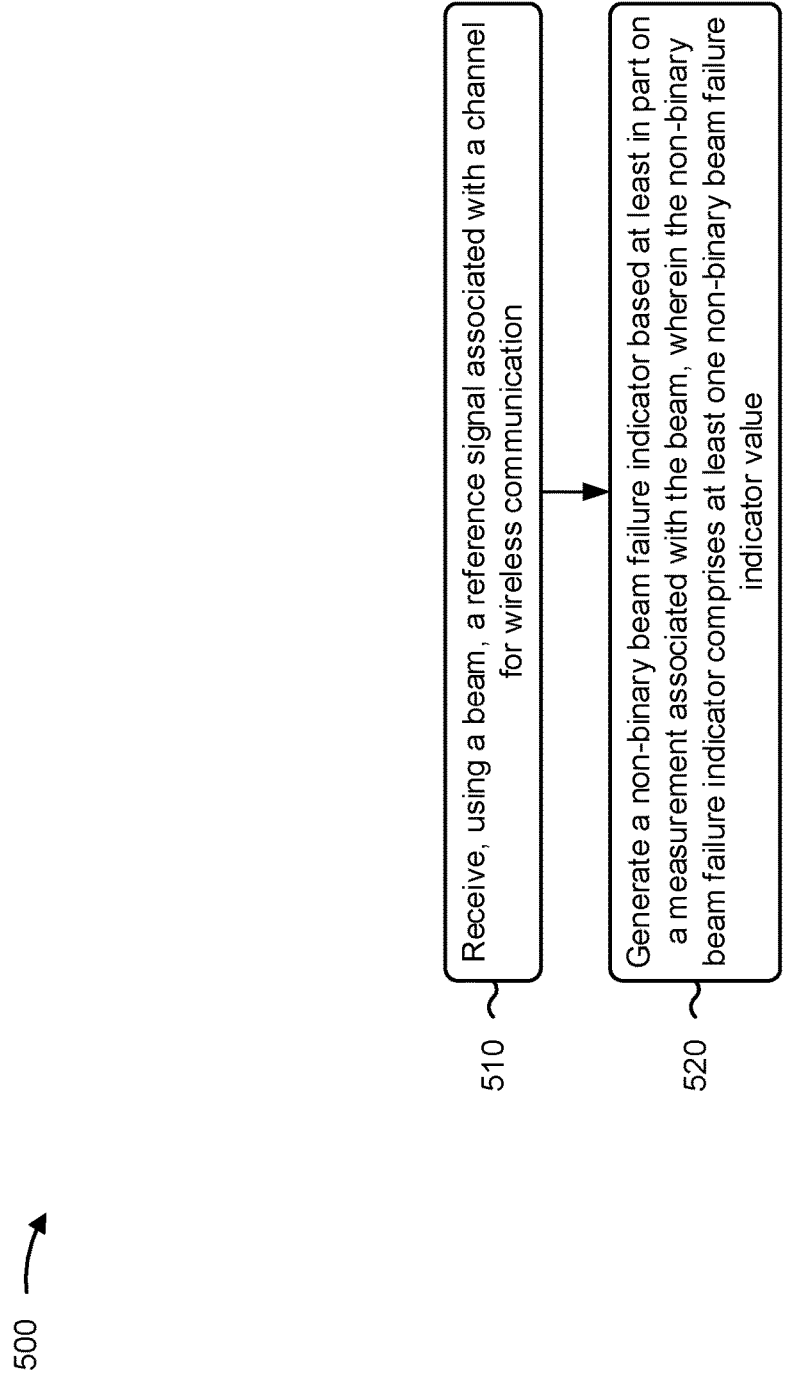
FIGS. 5 and 6 are diagrams illustrating example processes associated with non-binary beam failure indicators, in accordance with the present disclosure.

FIG. 5 is a diagram illustrating an example process 500 performed, for example, by a UE, in accordance with the present disclosure. Example process 500 is an example where the UE (e.g., UE 120) performs operations associated with non-binary BFIs.

As shown in FIG. 5, in some aspects, process 500 may include receiving, using a beam, a reference signal associated with a channel for wireless communication (block 510). For example, the UE (e.g., using communication manager 140 and/or reception component 702, depicted in FIG. 7) may receive, using a beam, a reference signal associated with a channel for wireless communication, as described above.

As further shown in FIG. 5, in some aspects, process 500 may include generating a non-binary BFI based at least in part on a measurement associated with the beam, wherein the non-binary BFI comprises at least one non-binary BFI value (block 520). For example, the UE (e.g., using communication manager 140 and/or generation component 708, depicted in FIG. 7) may generate a non-binary BFI based at least in part on a measurement associated with the beam, wherein the non-binary BFI comprises at least one non-binary BFI value, as described above.

Process 500 may include additional aspects, such as any single aspect or any combination of aspects described below and/or in connection with one or more other processes described elsewhere herein.

In a first aspect, the at least one non-binary BFI value comprises a real number value.

In a second aspect, alone or in combination with the first aspect, the at least one non-binary BFI value is zero and wherein the non-binary BFI indicates that a radio link quality associated with a current measurement occasion satisfies a radio link quality threshold.

In a third aspect, alone or in combination with one or more of the first and second aspects, a relative size of the at least one non-binary BFI value corresponds to a relative strength of a beam failure indication.

In a fourth aspect, alone or in combination with one or more of the first through third aspects, process 500 includes generating a beam failure report based at least in part on determining a count of a plurality of beam failure indications, wherein the at least one non-binary BFI value comprises a weight associated with at least one beam failure indication of the plurality of beam failure indications.

In a fifth aspect, alone or in combination with the fourth aspect, the non-binary BFI indicates a current channel condition associated with the beam.

In a sixth aspect, alone or in combination with one or more of the first through fifth aspects, a relative size of the at least one non-binary BFI value corresponds to at least one relative channel condition measurement associated with the beam.

In a seventh aspect, alone or in combination with one or more of the first through sixth aspects, generating the non-binary BFI comprises generating the non-binary BFI using a medium access control layer of the UE.

In an eighth aspect, alone or in combination with one or more of the first through seventh aspects, process 500 includes determining at least one rounded non-binary BFI value by rounding the at least one non-binary BFI value to at least one nearest integer, and determining a count of a plurality of beam failure indications based at least in part on the at least one rounded non-binary BFI value.

In a ninth aspect, alone or in combination with one or more of the first through eighth aspects, process 500 includes determining a count of a plurality of beam failure indications based at least in part on the at least one non-binary BFI value.

In a tenth aspect, alone or in combination with one or more of the first through ninth aspects, generating the non-binary BFI comprises generating the non-binary BFI using a physical protocol layer of the UE.

In an eleventh aspect, alone or in combination with one or more of the first through tenth aspects, at least one non-binary BFI value comprises a first non-binary BFI value associated with noise and a second non-binary BFI value associated with interference.

In a twelfth aspect, alone or in combination with one or more of the first through eleventh aspects, process 500 includes receiving a non-binary BFI configuration that indicates one or more parameter values.

In a thirteenth aspect, alone or in combination with the twelfth aspect, the one or more parameter values indicate a lookup table that maps a set of potential non-binary BFI values to a set of potential channel condition estimates, and wherein the method further comprises generating the at least one non-binary BFI value based at least in part on the lookup table.

In a fourteenth aspect, alone or in combination with the twelfth aspect, the one or more parameter values indicate a calculation function for generating the at least one non-binary BFI value based at least in part on at least one channel condition estimate, and wherein the method further comprises generating the at least one non-binary BFI value based at least in part on the calculation function.

In a fifteenth aspect, alone or in combination with the fourteenth aspect, the at least one channel condition estimate comprises at least one of a channel quality measurement or an interference measurement.

In a sixteenth aspect, alone or in combination with one or more of the twelfth through fifteenth aspects, process 500 includes receiving a radio resource control message comprising the non-binary BFI configuration, receiving a dynamic communication comprising a parameter switch indication associated with a first parameter value of the one or more parameter values and a second parameter value of the one or more parameter values, the dynamic communication comprising at least one of a DCI transmission or a MAC CE, and switching from the first parameter value to the second parameter value based at least in part on the parameter switch indication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
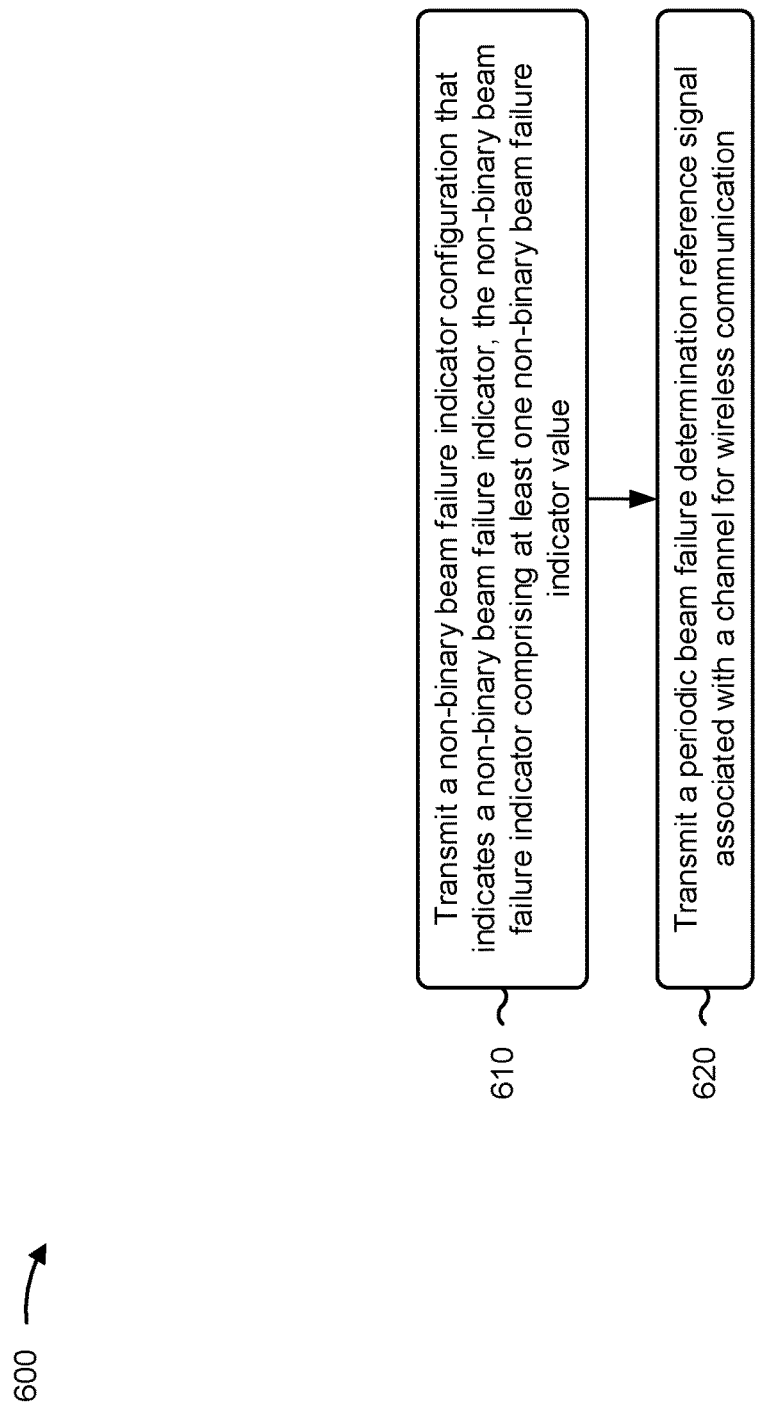

FIG. 6 is a diagram illustrating an example process 600 performed, for example, by a base station, in accordance with the present disclosure. Example process 600 is an example where the base station (e.g., base station 110) performs operations associated with non-binary BFIs.

As shown in FIG. 6, in some aspects, process 600 may include transmitting a non-binary BFI configuration that indicates a non-binary BFI, the non-binary BFI comprising at least one non-binary BFI value (block 610). For example, the base station (e.g., using communication manager 150 and/or transmission component 804, depicted in FIG. 8) may transmit a non-binary BFI configuration that indicates a non-binary BFI, the non-binary BFI comprising at least one non-binary BFI value, as described above.

As further shown in FIG. 6, in some aspects, process 600 may include transmitting a periodic beam failure determination reference signal associated with a channel for wireless communication (block 620). For example, the base station (e.g., using communication manager 150 and/or transmission component 804, depicted in FIG. 8) may transmit a periodic beam failure determination reference signal associated with a channel for wireless communication, as described above.

Process 600 may include additional aspects, such as any single aspect or any combination of aspects described below and/or in connection with one or more other processes described elsewhere herein.

In a first aspect, the at least one non-binary BFI value comprises a real number value.

In a second aspect, alone or in combination with the first aspect, a relative size of the at least one non-binary BFI value corresponds to a relative strength of a beam failure indication.

In a third aspect, alone or in combination with one or more of the first and second aspects, the non-binary BFI indicates a current channel condition associated with a beam.

In a fourth aspect, alone or in combination with the third aspect, a relative size of the at least one non-binary BFI value corresponds to at least one relative channel condition measurement associated with the beam.

In a fifth aspect, alone or in combination with one or more of the first through fourth aspects, at least one non-binary BFI value comprises a first non-binary BFI value associated with noise and a second non-binary BFI value associated with interference.

In a sixth aspect, alone or in combination with one or more of the first through fifth aspects, the non-binary BFI configuration indicates one or more parameter values.

In a seventh aspect, alone or in combination with the sixth aspect, the one or more parameter values indicate a lookup table that maps a set of potential non-binary BFI values to a set of potential channel condition estimates.

In an eighth aspect, alone or in combination with the sixth aspect, the one or more parameter values indicate a calculation function for generating the at least one non-binary BFI value based at least in part on at least one channel condition estimate.

In a ninth aspect, alone or in combination with one or more of the sixth through eighth aspects, process 600 includes transmitting a dynamic communication comprising a parameter switch indication associated with a first parameter value of the one or more parameter values and a second parameter value of the one or more parameter values, the dynamic communication comprising at least one of a DCI transmission or a MAC CE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
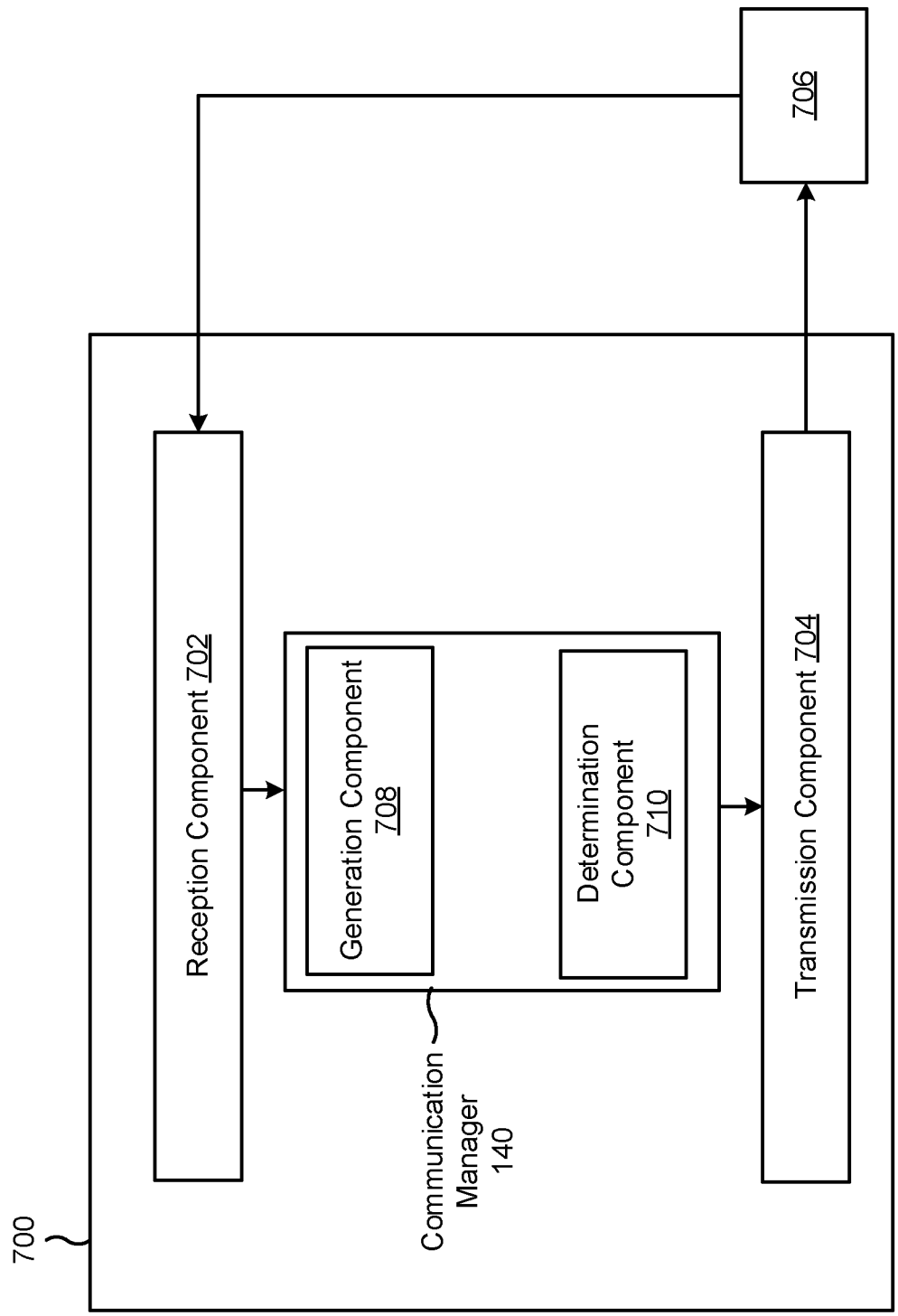
FIGS. 7 and 8 are block diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706

(such as a UE, a base station, or another wireless communication device) using the reception component 702 and the transmission component 704. As further shown, the apparatus 700 may include the communication manager 140. The communication manager 140 may include a generation component 708 and a determination component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, using a beam, a reference signal associated with a channel for wireless communication. The generation component 708 may generate a non-binary BFI based at least in part on a measurement associated with the beam, wherein the non-binary BFI comprises at least one non-binary BFI value. In some aspects, the generation component 708 may include one or more antennas, a modem, a modulator, a transmit MIMO processor, a transmit processor, a controller/processor, a memory, or a combination thereof, of the UE described in connection with FIG. 2.

The generation component 708 may generate a beam failure report based at least in part on determining a count of a plurality of beam failure indications, wherein the at least one non-binary BFI value comprises a weight associated with at least one beam failure indication of the plurality of beam failure indications.

The determination component 710 may determine at least one rounded non-binary BFI value by rounding the at least one non-binary BFI value to at least one nearest integer. In some aspects, the determination component 710 may include one or more antennas, a modem, a modulator, a transmit MIMO processor, a transmit processor, a controller/processor, a memory, or a combination thereof, of the UE described in connection with FIG. 2

The determination component 710 may determine a count of a plurality of beam failure indications based at least in part on the at least one rounded non-binary BFI value.

The determination component 710 may determine a count of a plurality of beam failure indications based at least in part on the at least one non-binary BFI value.

The reception component 702 may receive a non-binary BFI configuration that indicates one or more parameter values.

The reception component 702 may receive a radio resource control message comprising the non-binary BFI configuration.

The reception component 702 may receive a dynamic communication comprising a parameter switch indication associated with a first parameter value of the one or more parameter values and a second parameter value of the one or more parameter values, the dynamic communication comprising at least one of a DCI transmission or a MAC CE.

The communication manager 140 may switch from the first parameter value to the second parameter value based at least in part on the parameter switch indication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
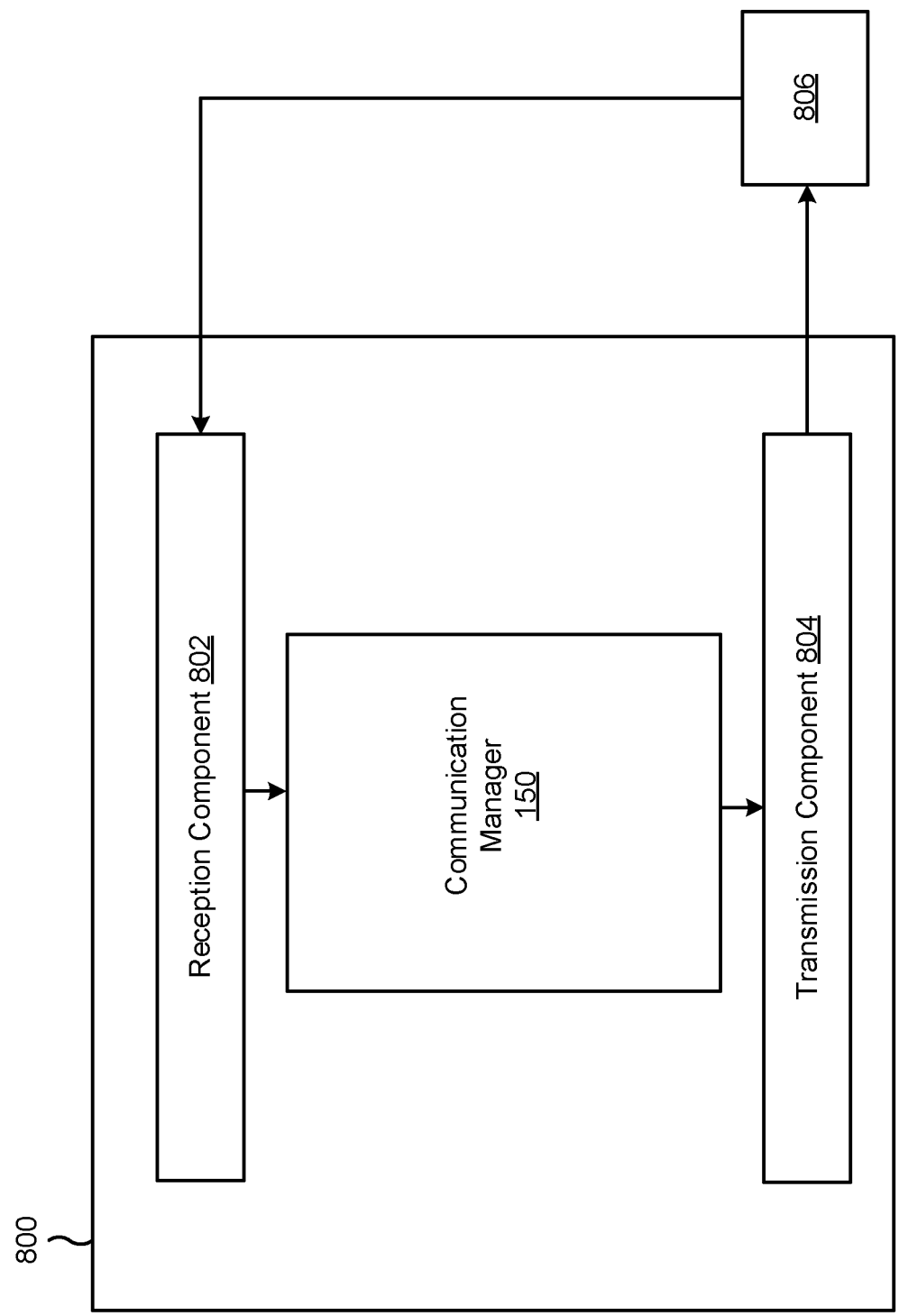

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may manage any number of different aspects of the operation of the reception component and/or the transmission component 804.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a non-binary BFI configuration that indicates a non-binary BFI, the non-binary BFI comprising at least one non-binary BFI value. The transmission component 804 may transmit a periodic beam failure determination reference signal associated with a channel for wireless communication.

The transmission component 804 may transmit a dynamic communication comprising a parameter switch indication associated with a first parameter value of the one or more parameter values and a second parameter value of the one or more parameter values, the dynamic communication comprising at least one of a DCI transmission or a MAC CE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, using a beam, a reference signal associated with a channel for wireless communication; and generating a non-binary beam failure indicator based at least in part on a measurement associated with the beam, wherein the non-binary beam failure indicator comprises at least one non-binary beam failure indicator value.

Aspect 2: The method of Aspect 1, wherein the at least one non-binary beam failure indicator value comprises a real number value.

Aspect 3: The method of either of Aspects 1 or 2, wherein the at least one non-binary beam failure indicator value is zero and wherein the non-binary beam failure indicator indicates that a radio link quality associated with a current measurement occasion satisfies a radio link quality threshold.

Aspect 4: The method of any of Aspects 1-3, wherein a relative size of the at least one non-binary beam failure indicator value corresponds to a relative strength of a beam failure indication.

Aspect 5: The method of any of Aspects 1-4, further comprising generating a beam failure report based at least in part on determining a count of a plurality of beam failure indications, wherein the at least one non-binary beam failure indicator value comprises a weight associated with at least one beam failure indication of the plurality of beam failure indications.

Aspect 6: The method of any of Aspects 1-5, wherein the non-binary beam failure indicator indicates a current channel condition associated with the beam.

Aspect 7: The method of Aspect 6, wherein a relative size of the at least one non-binary beam failure indicator value corresponds to at least one relative channel condition measurement associated with the beam.

Aspect 8: The method of any of Aspects 1-7, wherein generating the non-binary beam failure indicator comprises generating the non-binary beam failure indicator using a medium access control layer of the UE.

Aspect 9: The method of any of Aspects 1-8, further comprising: determining at least one rounded non-binary beam failure indicator value by rounding the at least one non-binary beam failure indicator value to at least one nearest integer; and determining a count of a plurality of beam failure indications based at least in part on the at least one rounded non-binary beam failure indicator value.

Aspect 10: The method of any of Aspects 1-9, further comprising determining a count of a plurality of beam failure indications based at least in part on the at least one non-binary beam failure indicator value.

Aspect 11: The method of any of Aspects 1-10, wherein generating the non-binary beam failure indicator comprises generating the non-binary beam failure indicator using a physical protocol layer of the UE.

Aspect 12: The method of any of Aspects 1-11, wherein the at least one non-binary beam failure indicator value comprises a first non-binary beam failure indicator value associated with noise and a second non-binary beam failure indicator value associated with interference.

Aspect 13: The method of any of Aspects 1-12, further comprising receiving a non-binary beam failure indicator configuration that indicates one or more parameter values.

Aspect 14: The method of Aspect 13, wherein the one or more parameter values indicate a lookup table that maps a set of potential non-binary beam failure indicator values to a set of potential channel condition estimates, and wherein the method further comprises generating the at least one non-binary beam failure indicator value based at least in part on the lookup table.

Aspect 15: The method of Aspect 13, wherein the one or more parameter values indicate a calculation function for generating the at least one non-binary beam failure indicator value based at least in part on at least one channel condition estimate, and wherein the method further comprises generating the at least one non-binary beam failure indicator value based at least in part on the calculation function.

Aspect 16: The method of Aspect 15, wherein the at least one channel condition estimate comprises at least one of a channel quality measurement or an interference measurement.

Aspect 17: The method of any of Aspects 13-16, further comprising: receiving a radio resource control message comprising the non-binary beam failure indicator configuration; receiving a dynamic communication comprising a parameter switch indication associated with a first parameter value of the one or more parameter values and a second parameter value of the one or more parameter values, the dynamic communication comprising at least one of a downlink control information transmission or a medium access control control element; and switching from the first parameter value to the second parameter value based at least in part on the parameter switch indication.

Aspect 18: A method of wireless communication performed by a base station, comprising: transmitting a non-binary beam failure indicator configuration that indicates a non-binary beam failure indicator, the non-binary beam failure indicator comprising at least one non-binary beam failure indicator value; and transmitting a periodic beam failure determination reference signal associated with a channel for wireless communication.

Aspect 19: The method of Aspect 18, wherein the at least one non-binary beam failure indicator value comprises a real number value.

Aspect 20: The method of either of Aspects 18 or 19, wherein a relative size of the at least one non-binary beam failure indicator value corresponds to a relative strength of a beam failure indication.

Aspect 21: The method of any of Aspects 18-20, wherein the non-binary beam failure indicator indicates a current channel condition associated with a beam.

Aspect 22: The method of Aspect 21, wherein a relative size of the at least one non-binary beam failure indicator value corresponds to at least one relative channel condition measurement associated with a beam.

Aspect 23: The method of any of Aspects 18-22, wherein the at least one non-binary beam failure indicator value comprises a first non-binary beam failure indicator value associated with noise and a second non-binary beam failure indicator value associated with interference.

Aspect 24: The method of any of Aspects 18-23, wherein the non-binary beam failure indicator configuration indicates one or more parameter values.

Aspect 25: The method of Aspect 24, wherein the one or more parameter values indicate a lookup table that maps a set of potential non-binary beam failure indicator values to a set of potential channel condition estimates.

Aspect 26: The method of Aspect 24, wherein the one or more parameter values indicate a calculation function for generating the at least one non-binary beam failure indicator value based at least in part on at least one channel condition estimate.

Aspect 27: The method of any of Aspects 24-26, further comprising transmitting a dynamic communication comprising a parameter switch indication associated with a first parameter value of the one or more parameter values and a second parameter value of the one or more parameter values, the dynamic communication comprising at least one of a downlink control information transmission or a medium access control control element.

Aspect 28: An apparatus for wireless communication at a device, comprising a processor; memory coupled with the processor; and instructions stored in the memory and executable by the processor to cause the apparatus to perform the method of one or more of Aspects 1-17.

Aspect 29: A device for wireless communication, comprising a memory and one or more processors coupled to the memory, the one or more processors configured to perform the method of one or more of Aspects 1-17.

Aspect 30: An apparatus for wireless communication, comprising at least one means for performing the method of one or more of Aspects 1-17.

Aspect 31: A non-transitory computer-readable medium storing code for wireless communication, the code comprising instructions executable by a processor to perform the method of one or more of Aspects 1-17.

Aspect 32: A non-transitory computer-readable medium storing a set of instructions for wireless communication, the set of instructions comprising one or more instructions that, when executed by one or more processors of a device, cause the device to perform the method of one or more of Aspects 1-17.

Aspect 33: An apparatus for wireless communication at a device, comprising a processor; memory coupled with the processor; and instructions stored in the memory and executable by the processor to cause the apparatus to perform the method of one or more of Aspects 18-27.

Aspect 34: A device for wireless communication, comprising a memory and one or more processors coupled to the memory, the one or more processors configured to perform the method of one or more of Aspects 18-27.

Aspect 35: An apparatus for wireless communication, comprising at least one means for performing the method of one or more of Aspects 18-27.

Aspect 36: A non-transitory computer-readable medium storing code for wireless communication, the code comprising instructions executable by a processor to perform the method of one or more of Aspects 18-27.

Aspect 37: A non-transitory computer-readable medium storing a set of instructions for wireless communication, the set of instructions comprising one or more instructions that, when executed by one or more processors of a device, cause the device to perform the method of one or more of Aspects 18-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories storing processor-executable code; and
   one or more processors coupled with the one or more memories, at least one processor of the one or more processors configured to cause the UE to:
      receive a non-binary beam failure indicator configuration that indicates one or more parameter values, wherein the one or more parameter values indicate a lookup table that maps a set of potential non-binary beam failure indicator values to a set of potential channel condition estimates;
      receive, using a beam, a reference signal associated with a channel for wireless communication; and
      generate, based at least in part on the lookup table, a non-binary beam failure indicator in accordance with a measurement associated with the beam, wherein the non-binary beam failure indicator comprises a weight associated with at least one non-binary beam failure indicator value.

2. The apparatus of claim 1, wherein the at least one non-binary beam failure indicator value comprises a real number value.

3. The apparatus of claim 1, wherein the at least one non-binary beam failure indicator value is zero and wherein the non-binary beam failure indicator indicates that a radio link quality associated with a current measurement occasion satisfies a radio link quality threshold.

4. The apparatus of claim 1, wherein a relative size of the at least one non-binary beam failure indicator value corresponds to a relative strength of a beam failure indication.

5. The apparatus of claim 1, wherein the one or more processors are further configured to generate a beam failure report in accordance with determining a count of a plurality of beam failure indications, wherein the weight is associated with at least one beam failure indication of the plurality of beam failure indications.

6. The apparatus of claim 5, wherein the non-binary beam failure indicator indicates a current channel condition associated with the beam.

7. The apparatus of claim 6, wherein a relative size of the at least one non-binary beam failure indicator value corresponds to at least one relative channel condition measurement associated with the beam.

8. The apparatus of claim 1, wherein the one or more processors, to generate the non-binary beam failure indicator, are configured to generate the non-binary beam failure indicator using a medium access control layer of the UE.

9. The apparatus of claim 1, wherein the one or more processors are further configured to:
   determine at least one rounded non-binary beam failure indicator value by rounding the at least one non-binary beam failure indicator value to at least one nearest integer; and
   determine a count of a plurality of beam failure indications in accordance with the at least one rounded non-binary beam failure indicator value.

10. The apparatus of claim 1, wherein the one or more processors are further configured to determine a count of a plurality of beam failure indications in accordance with the at least one non-binary beam failure indicator value.

11. The apparatus of claim 1, wherein the one or more processors, to generate the non-binary beam failure indicator, are configured to generate the non-binary beam failure indicator using a physical protocol layer of the UE.

12. The apparatus of claim 1, wherein the at least one non-binary beam failure indicator value comprises a first non-binary beam failure indicator value associated with noise and a second non-binary beam failure indicator value associated with interference.

13. The apparatus of claim 1, wherein the one or more processors are further configured to generate the at least one non-binary beam failure indicator value in accordance with the lookup table.

14. The apparatus of claim 1, wherein the one or more parameter values indicate a calculation function for generating the at least one non-binary beam failure indicator value in accordance with at least one channel condition estimate, and wherein the one or more processors are further configured to generate the at least one non-binary beam failure indicator value in accordance with the calculation function.

15. The apparatus of claim 14, wherein the at least one channel condition estimate comprises at least one of a channel quality measurement or an interference measurement.

16. The apparatus of claim 1, wherein the one or more processors are further configured to:
receive a radio resource control message comprising the non-binary beam failure indicator configuration;
receive a dynamic communication comprising a parameter switch indication associated with a first parameter value of the one or more parameter values and a second parameter value of the one or more parameter values, the dynamic communication comprising at least one of a downlink control information transmission or a medium access control (MAC) control element (CE); and
switch from the first parameter value to the second parameter value in accordance with the parameter switch indication.

17. An apparatus for wireless communication at a base station, comprising:
one or more memories storing processor-executable code; and
one or more processors coupled to the one or more memories, at least one processor of the one or more processors configured to cause the base station to:
transmit a non-binary beam failure indicator configuration that indicates a non-binary beam failure indicator, the non-binary beam failure indicator comprising a weight associated with at least one non-binary beam failure indicator value, wherein the non-binary beam failure indicator configuration indicates one or more parameter values, wherein the one or more parameter values indicate a lookup table that maps a set of potential non-binary beam failure indicator values to a set of potential channel condition estimates; and
transmit a periodic beam failure determination reference signal associated with a channel for wireless communication.

18. The apparatus of claim 17, wherein the at least one non-binary beam failure indicator value comprises a real number value.

19. The apparatus of claim 17, wherein a relative size of the at least one non-binary beam failure indicator value corresponds to a relative strength of a beam failure indication.

20. The apparatus of claim 17, wherein the non-binary beam failure indicator indicates a current channel condition associated with a beam.

21. The apparatus of claim 17, wherein a relative size of the at least one non-binary beam failure indicator value corresponds to at least one relative channel condition measurement associated with a beam.

22. The apparatus of claim 17, wherein the at least one non-binary beam failure indicator value comprises a first non-binary beam failure indicator value associated with noise and a second non-binary beam failure indicator value associated with interference.

23. The apparatus of claim 17, wherein the one or more parameter values indicate a calculation function for generating the at least one non-binary beam failure indicator value in accordance with at least one channel condition estimate.

24. The apparatus of claim 17, wherein the one or more processors are further configured to transmit a dynamic communication comprising a parameter switch indication associated with a first parameter value of the one or more parameter values and a second parameter value of the one or more parameter values, the dynamic communication comprising at least one of a downlink control information transmission or a medium access control (MAC) control element (CE).

25. A method of wireless communication performed at a user equipment (UE), comprising:
receiving a non-binary beam failure indicator configuration that indicates one or more parameter values, wherein the one or more parameter values indicate a lookup table that maps a set of potential non-binary beam failure indicator values to a set of potential channel condition estimates;
receiving, using a beam, a reference signal associated with a channel for wireless communication; and
generating, based at least in part on the lookup table, a non-binary beam failure indicator in accordance with a measurement associated with the beam, wherein the non-binary beam failure indicator comprises a weight associated with at least one non-binary beam failure indicator value.

26. The method of claim 25, wherein the at least one non-binary beam failure indicator value comprises a real number value.

27. The method of claim 25, wherein the at least one non-binary beam failure indicator value is zero and wherein the non-binary beam failure indicator indicates that a radio link quality associated with a current measurement occasion satisfies a radio link quality threshold.

28. The method of claim 25, wherein a relative size of the at least one non-binary beam failure indicator value corresponds to a relative strength of a beam failure indication.

29. A method of wireless communication performed at a base station, comprising:
transmitting a non-binary beam failure indicator configuration that indicates a non-binary beam failure indicator, the non-binary beam failure indicator comprising a weight associated with at least one non-binary beam failure indicator value, wherein the non-binary beam failure indicator configuration indicates one or more parameter values, wherein the one or more parameter values indicate a lookup table that maps a set of potential non-binary beam failure indicator values to a set of potential channel condition estimates; and transmitting a periodic beam failure determination reference signal associated with a channel for wireless communication.

* * * * *